(12) United States Patent  (10) Patent No.: US 8,127,620 B2
Morita et al.  (45) Date of Patent: Mar. 6, 2012

(54) LOAD SENSOR-CONTAINING ACTUATOR

(75) Inventors: Shinsuke Morita, Tokyo (JP); Masato Shimokawa, Tokyo (JP); Kazuyuki Nagase, Tokyo (JP); Yoshinori Ishibashi, Tokyo (JP); Yuji Hosokawa, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 11 days.

(21) Appl. No.: 12/742,156

(22) PCT Filed: Aug. 26, 2008

(86) PCT No.: PCT/JP2008/065199
§ 371 (c)(1),
(2), (4) Date: Aug. 27, 2010

(87) PCT Pub. No.: WO2009/063673
PCT Pub. Date: May 22, 2009

(65) Prior Publication Data
US 2010/0313682 A1 Dec. 16, 2010

(30) Foreign Application Priority Data

Nov. 13, 2007 (JP) ................................. 2007-294963

(51) Int. Cl.
*F16B 31/02* (2006.01)
(52) U.S. Cl. ........................................................ 73/761
(58) Field of Classification Search .................. 73/761
See application file for complete search history.

(56) References Cited

U.S. PATENT DOCUMENTS

| 5,058,439 | A * | 10/1991 | Carpenter | 73/862.21 |
| 6,814,558 | B2 * | 11/2004 | Kubota et al. | 425/145 |
| 7,654,158 | B2 * | 2/2010 | Weems | 73/862.193 |
| 2003/0221258 | A1 | 12/2003 | Nagaoka et al. | |

FOREIGN PATENT DOCUMENTS

JP 63-251144 10/1988
(Continued)

OTHER PUBLICATIONS

International Search Report issued Nov. 25, 2008 in International (PCT) Application No. PCT/JP2008/065199.

*Primary Examiner* — Lisa Caputo
*Assistant Examiner* — Octavia Davis
(74) *Attorney, Agent, or Firm* — Wenderoth, Lind & Ponack, LLP

(57) ABSTRACT

Various means for detecting the load on the bottom of a bed are proposed, but they have various problems, since the load sensor is provided separately from a bed or installed outside a bed.

This invention solves the abovementioned problems by a load sensor-containing actuator in which one end side of a screw shaft 1 is rotatably supported by a base body 2; a female threaded member 3 is engaged with the screw shaft; and an actuation rod body 4 fixed to the female threaded member can advance and retreat in the axial direction of the screw shaft, wherein the base body is provided with a thrust bearing 6 coaxially with the screw shaft and an actuation cylinder 7 supporting the one end side of the screw shaft in the axial direction via the thrust bearing; a detection cylinder 9 is provided between the actuation cylinder and a support member 8 for the base body; and a strain gauge 10 is attached to the outside surface of the detection cylinder.

The present invention relates to a foldable side rail for a bed or the like, particularly a foldable side rail in which multiple strut members are pivotally rotatably connected between an upper crosspiece member and a lower crosspiece member to form a parallel link mechanism.

5 Claims, 4 Drawing Sheets

FOREIGN PATENT DOCUMENTS

| | | |
|---|---|---|
| JP | 6-2438 | 1/1994 |
| JP | 2003-014072 | 1/2003 |
| JP | 2003-287065 | 10/2003 |
| JP | 2004-000557 | 1/2004 |

* cited by examiner

LOAD SENSOR-CONTAINING ACTUATOR

This application is a 371 of PCT/JP2008/065199.

TECHNICAL FIELD

The present invention relates to a load sensor-containing actuator.

BACKGROUND ART

An actuator, in which one end side of a screw shaft is rotatably supported by a base body; a female threaded member is engaged with the screw shaft; and an actuation rod body fixed to the female threaded member can advance and retreat in the axial direction of the screw shaft, is widely used in a lifting mechanism for the bottom of a bed, etc.

On the other hand, recently for example as disclosed in Patent Document 1, it is practiced to install load sensors in all the legs of a bed so that the loads on the bed bottom can be detected as the body weight and movements of the patient to be referred to for care, nursing, etc. For example, the loads measured can be used to detect and notify that the user of a bed such as an elderly person gets off from the bed bottom, for preventing the occurrence of any accident, etc.

Means for detecting a load on a bed bottom include various means such as detecting the change of pressure in an envelope caused by a load.

Patent Document 1; JP11-342160A

DISCLOSURE OF THE INVENTION

Problems to be Solved by the Invention

A load sensor separate from a bed as in Patent Document 1 or installed outside has the following problems.

1. A load sensor and a cable connected with it are exposed on the floor of a hospital room. Therefore in the service environment, it is difficult to secure environment resistant performance such as waterproof property, dustproof property, impact resistance and vibration resistance.

2. Whenever a bed is moved, the load sensor must be disconnected very inconveniently.

The object of this invention is to solve these problems.

Means for Solving the Problems

The present invention proposes a load sensor-containing actuator in which one end side of a screw shaft is rotatably supported by a base body; a female threaded member is engaged with the screw shaft; and an actuation rod body fixed to the female threaded member can advance and retreat in the axial direction of the screw shaft, wherein the base body is provided with a thrust bearing coaxially with the screw shaft and an actuation cylinder supporting the one end side of the screw shaft in the axial direction via the thrust bearing; a detection cylinder is provided between the actuation cylinder and a support member for the base body; and a strain gauge is attached to the outside surface of the detection cylinder.

Further, this invention proposes the abovementioned constitution, wherein a detection means for detecting the signal of the strain gauge is installed in the base body; and electric wiring is used to deliver the detected signal to outside the base body.

Furthermore, this invention proposes the abovementioned constitution, wherein a detection means for detecting the signal of the strain gauge is installed in the base body; and a wireless communication means is provided in the detection means, to deliver the detected signal by wireless communication to outside the base body.

Moreover, this invention proposes the abovementioned constitution, wherein the support member can be attached to and detached from the base body.

Still furthermore, this invention proposes the abovementioned constitution, wherein a small diameter portion is formed on the one end side of the screw shaft; and the thrust bearing is disposed at the small diameter portion, to transmit the load in the axial direction.

EFFECTS OF THE INVENTION

In the actuator of this invention, the load transmitted from the actuation rod body to the screw shaft via the female threaded member is transmitted to the actuation cylinder via the thrust bearing, to compress the detection cylinder disposed between the actuation cylinder and the support member in the axial direction.

The detection cylinder compressed in the axial direction is elastically deformed to bulge out in the middle portion like a barrel, and the strain gauge fixed on the outside surface is deformed in response to the elastic deformation. Thus, the load applied via the actuation rod body can be measured in reference to the deformation of the strain gauge.

Especially the detection cylinder with the strain gauge attached thereto, and the thrust bearing and the actuation cylinder respectively transmitting the load to the detection cylinder can be compactly accommodated in the base body, since they are coaxial with the screw shaft.

Therefore, the load sensor-containing actuator of this invention can be used in a lifting mechanism of a bed, etc., since the actuator can have the same external form and other constitution as those of the conventional actuator, except that the former contains a load sensor in the base body. In this case, the actuator can measure the load on the bed as a component integral with the bed.

The detected signal of the strain gauge contained in the actuator can be delivered by electric wiring via a detection means such as an amplifier to outside the actuator or by wireless communication to outside the actuator, to be applied to a load measuring means. In the former case, the electric wiring can be led out from the same lead-out portion as that for motor wiring, etc. and it is not necessary to install any special lead-out portion.

In the case where this invention is used for a bed, since the load sensor and the cable connected with it are not exposed on the floor of the sickroom, environment resistant performance such as waterproof property, dustproof property, impact resistance and vibration resistance can be easily secured.

Further, also in the case where the bed is moved, the troublesome work of removing the load sensor is not necessary.

Furthermore, in the load sensor-containing actuator of this invention, since the load sensor and the actuator are integrated, the adjustment of the load sensor as a system can be completed when the load sensor-containing actuator per se is produced, and the calibration is not required when the load sensor-containing actuator is installed in a bed, etc. Thus, the process and cost of assembling into a bed, etc. can be reduced.

Moreover, if the support member can be attached to and detached from the base body in the load sensor-containing actuator of this invention, the support member having the detection cylinder and the strain gauge can be exchanged by the corresponding set suitable for each load range required. Therefore, the actuator can be easily changed to suit any of variously different load ranges. Furthermore, if a support member with a support rib projected instead of the detection cylinder is attached to the base body instead, an actuator identical in external form but not containing a load sensor can be easily constituted.

Figure 1:
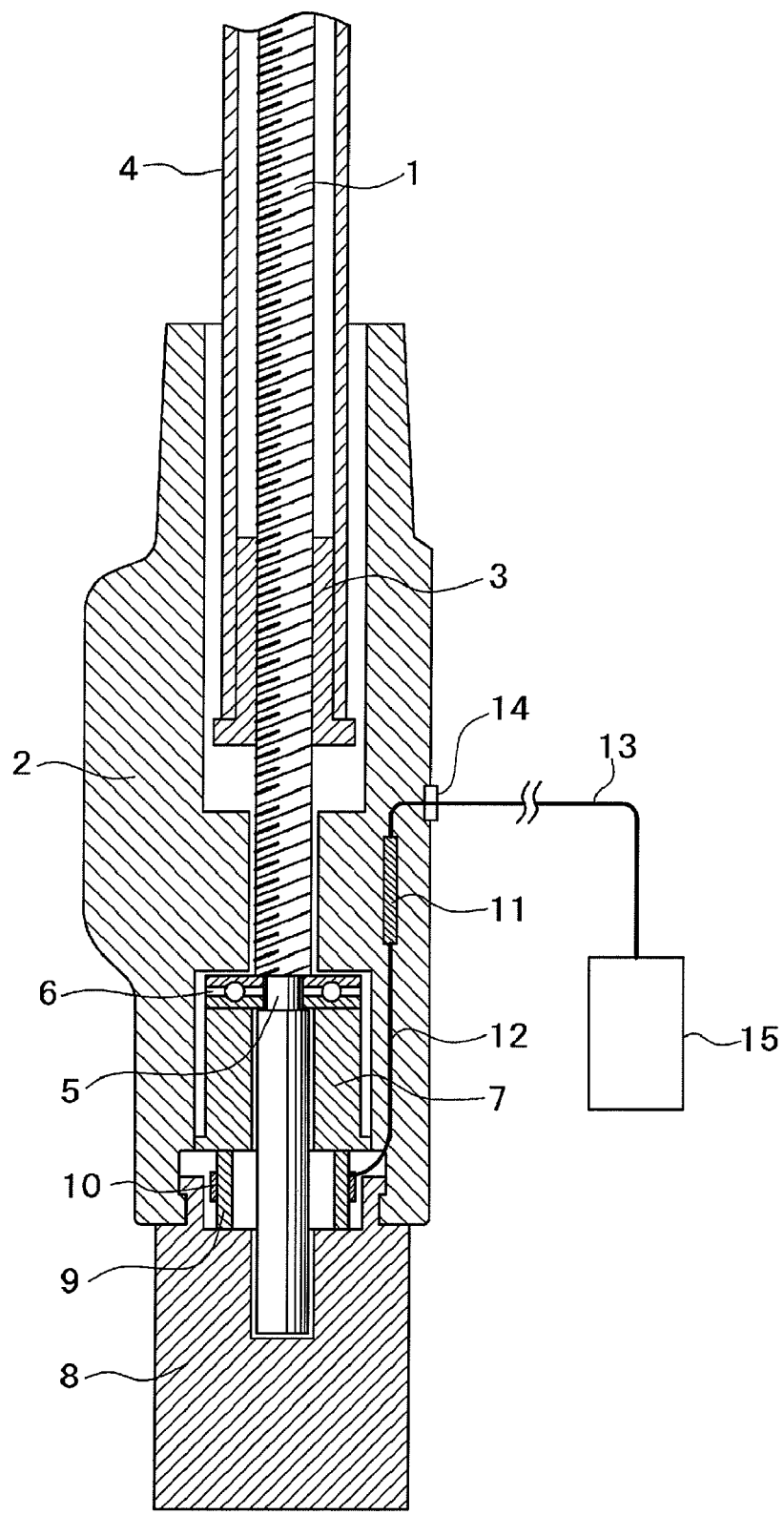
FIG. 1 is an illustrative vertical sectional view showing an embodiment of the load sensor-containing actuator of this invention.

MEANINGS OF SYMBOLS 1 screw shaft
2 base body
3 female threaded member
4 actuation rod body
5 small diameter portion
6 thrust bearing
7 actuation cylinder
8 support member
9 detection cylinder
10 strain gauge
11 circuit board
12 signal wiring
13 output wiring
14 cord cap
15 controller
16 support rib

THE BEST MODES FOR CARRYING OUT THE INVENTION

Embodiments of this invention are explained below in reference to the attached drawings.

FIGS. 1 through 4 are illustrative vertical sectional views showing embodiments of the load sensor-containing actuator of this invention.

Symbol 1 denotes a screw shaft, and one end side of the screw shaft 1 is rotatably supported by a base body 2. A female threaded member 3 is engaged with the screw shaft 1, and an action rod body 4 is fixed to the female threaded member 3. The action rod body 4 can advance and retreat in the axial direction of the screw shaft 1. Meanwhile, the base body 2 is hatched in the drawings, but the hatched portion does not necessarily indicate a solid portion, and can also be a hollow portion as appropriate. Further, though not shown in the drawings, a rotatable radial bearing restrained in the radial direction only can be installed at any appropriate place between the base body 2 and the screw shaft 1.

Symbol 5 denotes a small diameter portion formed on the one end side of the screw shaft 1, and a thrust bearing 6 is disposed at the small diameter portion 5, to transmit the load of the screw shaft 1 from the upper face of the recess formed around the small diameter portion 5 to the upper member of the thrust bearing 6. Further, below the lower member of the thrust bearing 6, an actuation cylinder 7 is provided. The thrust bearing 6 and the actuation cylinder 7 are disposed outside the screw shaft 1 coaxially with the screw shaft 1.

Figure 2:
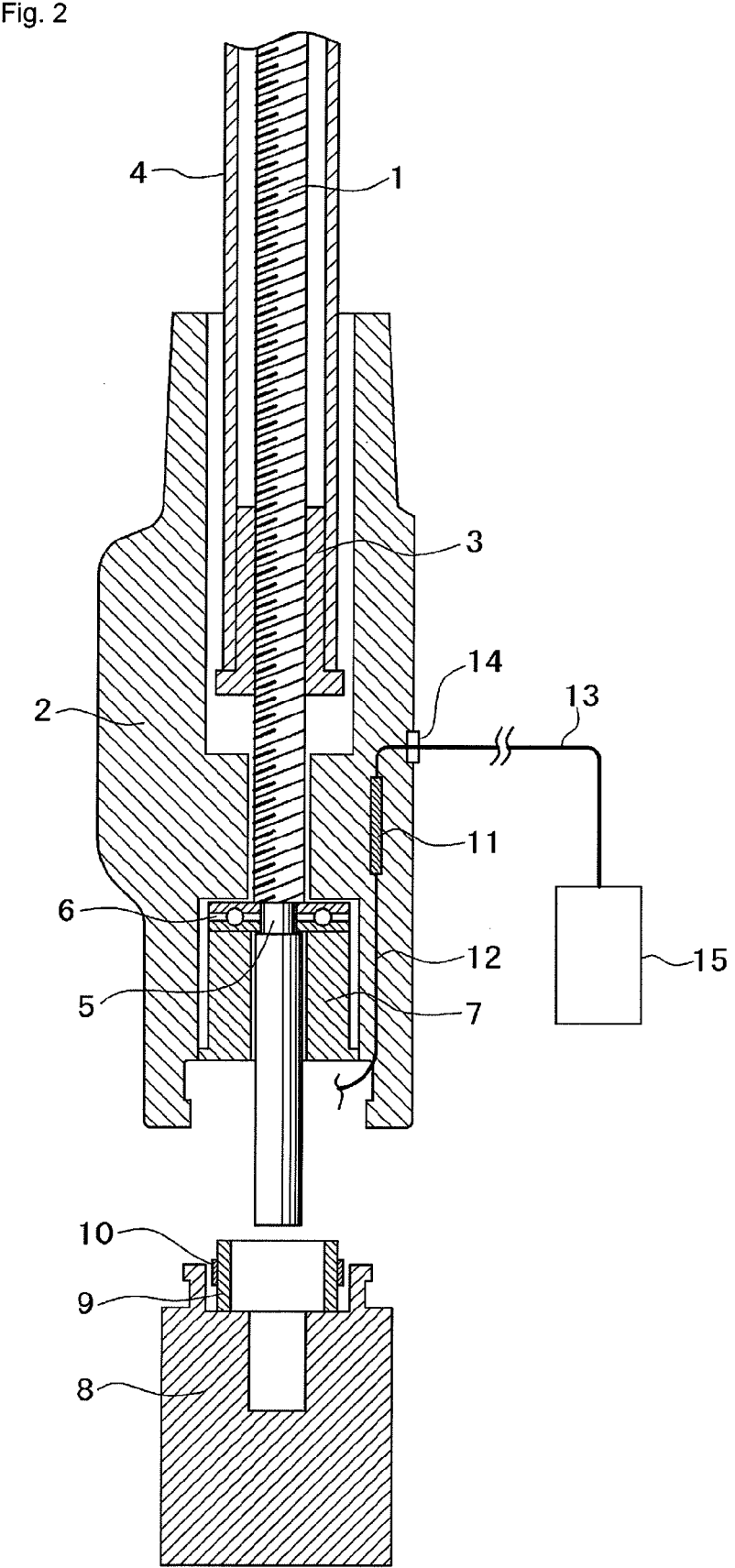
FIG. 2 is an illustrative vertical sectional view showing the actuator of FIG. 1, in which the support member is detached from the base body.

Symbol 8 denotes a support member, and the support member 8 can be attached to the rear side of the base body 2 as shown in FIGS. 1 and 2. The attaching mechanism can be, for example, a binding mechanism using fasteners such as screws or using threaded engagement, etc.

From the support member 8, a detection cylinder 9 is projected, and when the support member is attached as shown in FIG. 1, the detection cylinder 9 is disposed outside the screw shaft 1 coaxially with the screw shaft 1, and the top face of the detection cylinder 9 contacts the bottom surface of the actuation cylinder 7.

Furthermore, a strain gauge 10 is attached to the outside surface of the detection cylinder 9. Symbol 11 denotes a circuit board, and the circuit board 11 is connected with the signal wiring 12 extending from the strain gauge 10 and contains a detection means for, for example, amplifying the detected signal of the strain gauge 10 as one of the functions of the circuit board 11. The output wiring 13 from the circuit board 11 is led outside the base body 1 from the lead-out portion having a cord cap 14 and connected with a controller 15 containing a load measuring means as one of the functions of the controller. The controller 15 and the circuit board 11 can also have such functions as the drive control and rotational speed detection of a motor not shown in the drawings, in addition to the abovementioned function of detecting the load concerning the strain gauge 10. Meanwhile, the circuit board 11 can also be omitted if the functions of the circuit board can be contained in the controller 15.

As described above, in this invention, since the detection cylinder 9 with the strain gauge 10 attached thereto, and the actuation cylinder 7 and the thrust bearing 6 for transmitting the load to the detection cylinder 9 are coaxial with the screw shaft 1, they can be compactly accommodated in the base body 2.

Thus, the load sensor-containing actuator of this invention can have the same external form and other constitution as those of the conventional actuator, except that the former contains a load sensor in the base body 2. Therefore, the actuator of this invention can be used in a lifting mechanism of a bed, etc. in the same mode as that of the conventional actuator.

That is, in this case, the load transmitted from the actuation rod body 4 to the screw shaft 1 via the female threaded member 3 is transmitted to the actuation cylinder 7 via the thrust bearing 6, to compress in the axial direction of the screw shaft 1, the detection cylinder 9 disposed between the actuation cylinder 7 and the support member 8.

The detection cylinder 9 compressed in the axial direction is elastically deformed to bulge out in the middle portion like a barrel, and the strain gauge 10 is deformed in response to the elastic deformation. Thus, the load applied via the actuation rod body 4 can be measured in reference to the deformation of the strain gauge 10. That is, in the case of this embodiment, the load from the bottom of the bed can be delivered as a detected signal via the circuit board 11 and the output wiring 13, to be measured by the controller 15 installed outside the actuator.

In the above embodiment, the signal detected by the strain gauge 10 contained in the actuator is delivered outside the actuator by the output wiring 13 via the lead-out portion having the cord cap 14. If the lead-out portion of the feeder and the signal wiring to a motor not shown in the drawings and to the circuit board 11 can be used as the lead-out portion, it is not necessary to install a lead-out portion special for the actuator.

Further, the circuit board 11 or the like can be provided with a wireless communication means, so that the signal detected by the strain gauge 10 can be sent to outside the actuator by wireless communication, to be measured by a load measuring means such as the controller 15, etc.

As explained above, if the load sensor-containing actuator of this invention is used for a bed, the load sensor for measuring the load on the bed and the cable extending from the load sensor are not exposed on the floor of the sickroom. Therefore, environment resistant performance such as waterproof property, dustproof property, impact resistance and vibration resistance can be easily secured.

Further, there is no trouble of removing the load sensor whenever the bed is moved.

Furthermore, in the above embodiment, since the support member 8 can be attached to and detached from the base body 2, the support member 8 can be replaced by a support member 8 having a detection cylinder 9 and a strain gauge 10 suitable for each load range. Therefore, the actuator can be easily changed to suit many different load ranges.

Figure 3:
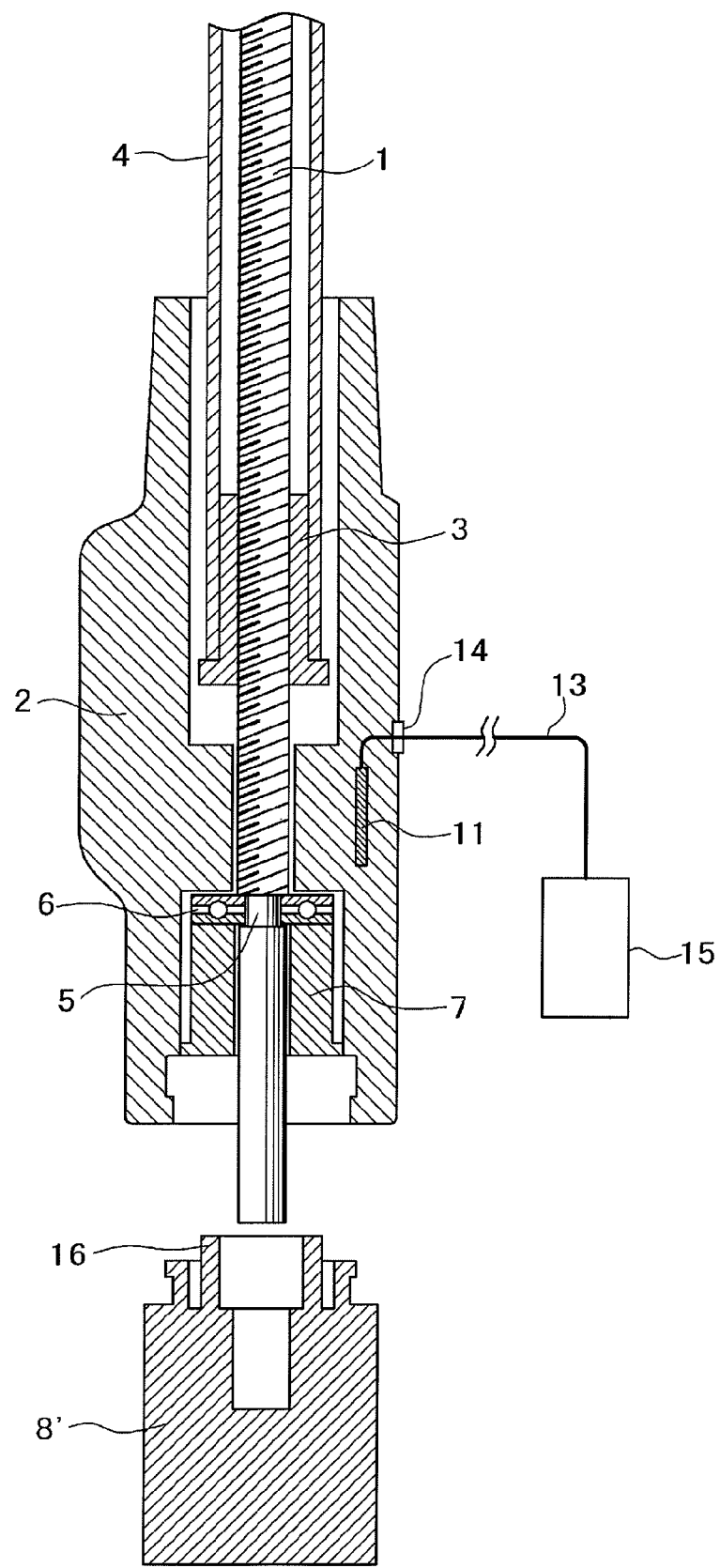
FIG. 3 is illustrative vertical sectional view showing the actuator of FIG. 1 together with another support member attachable to the base body.
Figure 4:
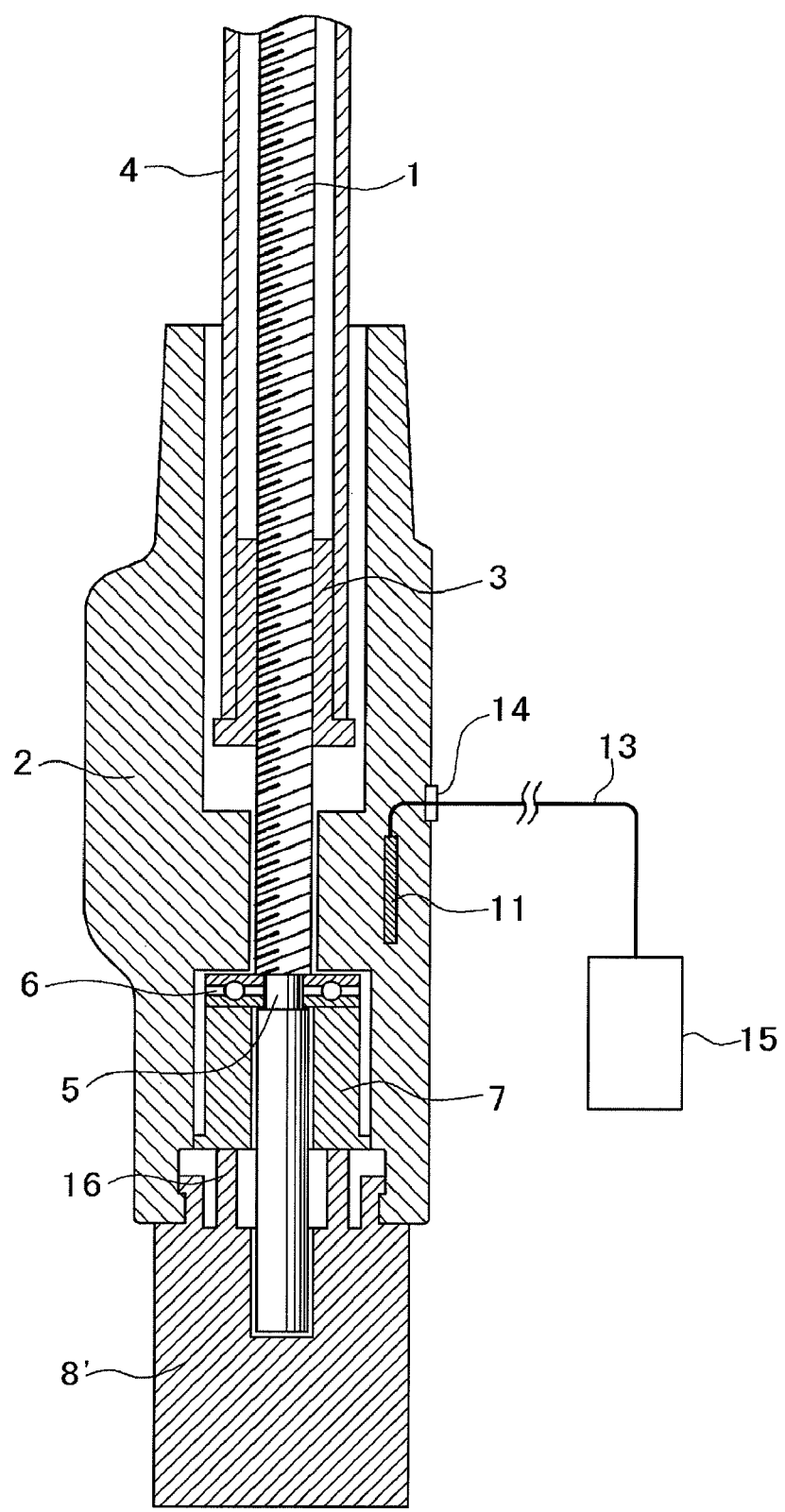
FIG. 4 is an illustrative vertical sectional view showing the actuator of FIG. 1, in which the other support member is attached to the base body.

Further, as shown in FIGS. 3 and 4, a support member 8' having a support rib 16 projected instead of the detection cylinder can be attached to the base body 2, to easily provide an actuator with the same external form but not containing a load sensor.

INDUSTRIAL APPLICABILITY

Since this invention is as described above, the load sensor-containing actuator of this invention can be used in a bottom lifting mechanism of a bed in a hospital, a facility for the elderly, or a general household, etc. The actuator of this invention can be installed integrally with a bed and used as a means for measuring the body weight of the user on the bed or for detecting such information as the body motion of the user. Having the abovementioned advantages, this invention is highly industrially applicable.

Further, in addition to the application to a bed, the load sensor-containing actuator of this invention can also be used as a load measurable actuator in a medical instrument, furniture, etc.

Furthermore, in addition to the application as an actuator, the load sensor-containing actuator of this invention can also be used as a load measuring instrument in which an actuation rod body can advance and retreat.

The invention claimed is:

1. A load sensor-containing actuator in which one end side of a screw shaft is rotatably supported by a base body; a female threaded member is engaged with the screw shaft; and an actuation rod body fixed to the female threaded member can advance and retreat in the axial direction of the screw shaft, wherein the base body is provided with a thrust bearing coaxially with the screw shaft and an actuation cylinder supporting the one end side of the screw shaft in the axial direction via the thrust bearing; a detection cylinder is provided between the actuation cylinder and a support member for the base body; and a strain gauge is attached to the outside surface of the detection cylinder.

2. A load sensor-containing actuator, according to claim 1, wherein a detection means for detecting the signal of the strain gauge is installed in the base body; and electric wiring is used to deliver the detected signal to outside the base body.

3. A load sensor-containing actuator, according to claim 1, wherein a detection means for detecting the signal of the strain gauge is installed in the base body; and a wireless communication means is provided in the detection means, to deliver the detected signal by wireless communication to outside the base body.

4. A load sensor-containing actuator, according to claim 1, wherein the support member can be attached to and detached from the base body.

5. A load sensor-containing actuator, according to claim 1, wherein a small diameter portion is formed on the one end side of the screw shaft; and the thrust bearing is disposed at the small diameter portion, to transmit the load in the axial direction.

* * * * *